May 23, 1967     R. L. CARLYLE ETAL     3,321,099
COMPOSITION FOR THE LAMINATION OF GLASS BY MEANS OF
EPOXY RESINOUS MATERIALS
Filed Feb. 4, 1963
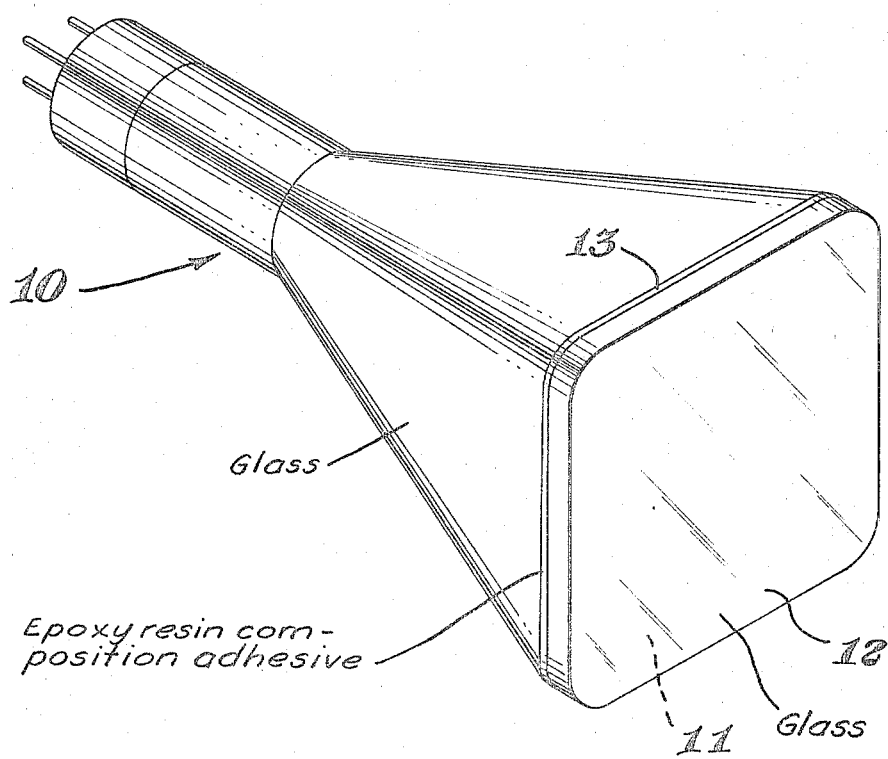
INVENTORS.
Robert L. Carlyle
Wilbur E. Johnson
Marjorie S. Johnson,
Executrix
BY
AGENT

United States Patent Office 3,321,099
Patented May 23, 1967

3,321,099
COMPOSITION FOR THE LAMINATION OF GLASS
BY MEANS OF EPOXY RESINOUS MATERIALS
Robert L. Carlyle, Lake Jackson, Tex., and Wilbur E. Johnson, deceased, late of Lake Jackson, Tex., by Marjorie S. Johnson, independent executrix, Lake Jackson, Tex., assignors to The Dow Chemical Company, Midland, Mich., a corporation of Delaware
Filed Feb. 4, 1963, Ser. No. 256,499
19 Claims. (Cl. 220—2.1)

This invention relates to laminates. It more particularly relates to an improved composition for the bonding or lamination of glass surfaces.

Many glass bodies require lamination to another glass body in order to provide adequate strength, protection or desired optical characteristics. Particularly critical and difficult in the field of glass to glass lamination is the application of caps or safety shields to the face of cathode ray tubes. Such tubes generally are evacuated to relatively low pressure and considerable hazard exists in the case of an implosion. Frequently, when such an evacuated body fractures, portions of the envelope and sometimes the base, are hurled at a dangerous velocity. In order to overcome this hazard it is customary to provide a safety shield in front of the viewing screen of the tube to prevent an appreciable hazard from flying debris. In order to provide a satisfactory shield and adequate viewing properties, it is known in the art to laminate glass sheets or caps to the viewing face of a cathode ray tube to prevent undesired reflection caused by glass to air surfaces and provide adequate mechanical protection. Such lamination is usually carried out employing an epoxy resin composition which polymerizes in a relatively short time after application. Much difficulty has been encountered with such materials as there is a marked tendency for the protective facing to delaminate from the tube envelope on temperature cycling and on standing. Generally, the molded glass tube envelopes, and glass caps, are not fabricated to close dimensional tolerances and delaminations most often occurs in such cases where the dimensional tolerances are the poorest. Generally, such tolerances may be sufficiently large to provide gaps of up to 100 mils or more between portions of the surfaces to be laminated. Usually, the lower the dimensional tolerances, the more readily is the safety shield laminated to the tube envelope without subsequent failure. However, as the tolerances increase the probability of failure becomes much greater.

It is an object of this invention to provide an improved resinous composition to be utilized in the lamination of glass articles.

It is a further object of the invention to provide an improved epoxy resin composition for the lamination of safety shields to the viewing screen or face of a cathode ray tube.

It is a further object of this invention to provide an epoxy resin composition for the lamination of safety shields to cathode ray tubes wherein relatively large dimensional tolerances are present.

These objects, benefits and other advantages in accordance with the invention are readily achieved by laminating two glass surfaces together by means of a laminating composition comprising:

(a) From about 15 to 45% by weight of an epoxy resin having an average molecular weight between 344 and 500 and preferably between 350 and 440 which resin is a bisphenol-A-epichlorohydrin reaction product having the general formula:

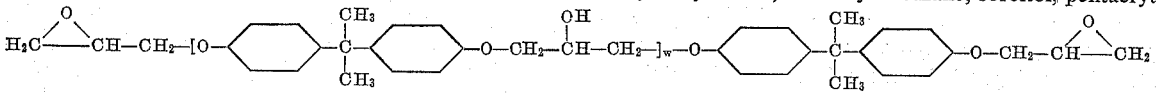

wherein $w$ is an integer of the series 0, 1, 2, 3, etc. While for any single molecule $w$ is an integer, the fact that the obtained product is a mixture of compounds causes the determined value of $w$ to be an average which is not necessarily zero or a whole number and in the practice of the present invention, the average value of $w$ beneficially is between 0.014 and 0.56 while in the preferred embodiment of the invention, it is advantageous that the average value of $w$ be from about 0.035 to 0.35, and said epoxy resin has an epoxy equivalent weight of from about 172 to 250, while in the preferred embodiment of the invention the equivalent weight is preferably from 175 to 220;

(b) From about 20 to 85% by weight of a polyglycol ether of from 700 to 3300 average molecular weight and preferably from 1000 to 3000 average molecular weight and having the general formula:

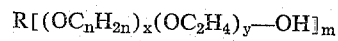

wherein R is a polyvalent aliphatic hydrocarbon radical containing from 3 to 12 carbon atoms, $x$ is a whole number from 1 to 19 and preferably from 1 to about 17, $y$ is an integer from 0 to 4, $n$ is an integer from 3 to 4 and $m$ is an integer from 3 to 8;

(c) From 0 to about 50% by weight and preferably, from about 5 to 15% by weight, of a glycol of from about 62 to 3000 average molecular weight and having the formula:

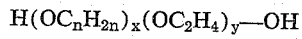

wherein $x$ is an integer from 1 to 52, $y$ is an integer from 0 to 13 and $n$ is an integer from 2 to 4; and (d) Containing from 0.05 to 0.15 part by weight of a boron trihalide hardening catalyst, e.g., boron trifluoride.

Additionally from 0 to 5% by weight of a color stabilizing agent comprising an aryl phosphite such as triphenyl phosphite or ortho-, meta-, or para-tricresyl phosphite is employed where low color and long term color stability are important. It is most advantageous to employ the color stabilizing agent in a concentration of from 1 to 5% by weight.

The epoxy resin starting material can be a mixture or blend of (1) diglycidyl ether of 4,4'-isopropylidene diphenol, i.e., the compound of the above formula when $w$ equals 0, and (2) the diglycidyl ether of 4,4'-(2 hydroxy trimethylene) bis(oxy-p-phenylene isopropylidene) diphenol, the compound of the above formula when $w$ equals 1, in proportions of from 0.4 to 0.99 gram molecular portion of diglycidyl ether (1) and from 0.6 to 0.01 molecular portion of diglycidyl ether (2), but it is preferably the epoxy resin resulting from the reaction of bisphenol A with epichlorohydrin in the presence of an alkali metal hydroxide which resin has an epoxy equivalent weight of from 172 to 250, preferably from 175 to 220. Such epoxy resins have the general formula given above and are available commercially. It is important to the success of the composition in lamination of safety caps to cathode ray tubes that the epoxy resin portion of the composition contain hydroxyl radicals in the range given by the general formula given above.

The polyglycol ether starting material may be a mixture of high and low molecular weight polyglycol ethers which have an average molecular weight of from about 700 to 3300 or it may be a single material within the definition which was prepared with a molecular weight within the specified range. Suitable polyglycol ethers include ethers of glycerine, trimethylol propane, 1,2,6-trihydroxyhexane, trimethylol ethane, sorbitol, pentaerythritol, sugars such as sucrose, dextrose, fructose, etc. and the like, having average molecular weights in the range of from about 700 to 3300. Optionally, the polyglycol chains attached to the glycerine base may also be mixed chains of polyoxypropylene or polyoxybutylene and the chains may be capped or terminated with up to about 25 mole percent of oxyethylene units based on the total oxyalkylene content of the molecule.

The glycol is an optional but desirable component of the composition which may be added to the other resin components to impart additional flexibility thereto. It may be employed in a concentration of up to 50% by weight and is preferably employed in a concentration of from about 5 to 15% by weight. The use of a glycol is particularly desirable when a lower molecular weight glycol ether is employed. Either polyoxypropylene, polyoxybutylene or mixtures thereof may be employed as the glycol but polyoxypropylene is generally preferred. Also, such glycol may be capped with ethylene oxide, if desired. The glycol component of the laminating composition is a viscous liquid having a molecular weight of from about 62 to 3000 and preferably from about 250 to 750.

A stabilizing agent, such as from 1.0 to 5.0% by weight, based on the total weight of the composition, of an aryl phosphite, e.g., triphenyl phosphite or an ortho-, meta-, or para-tricresyl phosphite, is employed when a particularly low color laminating resin is desired. The use of a stabilizing amount of an aryl phosphite in the laminating resin composition not only maintains a low color level during the curing of the resin but provides a resin which will retain its low color characteristic for long periods of time.

It is most preferable that the complete resin composition prior to curing have a viscosity at dispensing temperature of <200 centipoises.

As hardeners for the resin composition, the boron trihalides are employed, with boron trifluoride being preferred. Amounts of from about 0.05 to 0.15% by weight of the boron trihalide is generally employed, based on total weight of mix, but it is generally advantageous to employ an amount which will cause the laminating composition to completely cure or harden in from 5 to 20 minutes at 60 degrees C. In adding the hardener to the resin composition, it is advantageous to add the total requirement of boron trihalide to a portion of the resin system containing no oxirane oxygen. If the boron trihalide is added as the etherate, the ether must be removed by distillation or other suitable means before the portion of the resin containing the hardener is mixed with the remainder of the composition. Any ether in the final laminating composition produces bubbles in the final cured laminate and is therefore undesirable.

The figure depicts a laminated article in accordance with the present invention.

In the figure there is depicted a cathode ray tube generally designated by the reference numeral 10. The cathode ray tube 10 has a viewing face 11 formed in the glass envelope thereof. A transparent glass safety cap 12 is disposed over the viewing face 11 and adhered thereto by means of an epoxy resin composition layer 13.

In the practice of the invention, the laminating resin is prepared in two parts. If a glycol is to be employed in the final composition, mixture A comprises the epoxy resin having an equivalent weight of from 172 to 240 and the polyglycol ether having an average molecular weight of from 700 to 3300 and, if color stabilization is desired, contains a small but effective portion of stabilizing agent such as from 1 to 5% by weight of an aryl phosphite and mixture B comprises the glycol having an average molecular weight of from about 62 to 3000, to which there has been added the hardener or catalyst, e.g., boron trifluoride in ether and the ether removed by distillation. If no glycol is employed all or a portion of the glycol ether is used in mixture B, as the carrier for the boron trihalide. The final laminating resin is prepared and cured by mixing about 100 parts by weight of mixture A, heated to about 50 to 60 degrees C. with about 9 parts by weight of mixture B at about room temperature. This resin mixture cures in the 60 to 80 degrees C. temperature range in from about 5 to 20 minutes in a thin film.

In laminating glass surfaces together utilizing the composition of the invention, the glass portions are heated to a temperature of from about 60 to about 80 degrees C. and maintained in spaced relationship to each other. The spacing is generally about 40 mils and the resin is added to the space between the surfaces.

It is important for the success of the invention that the hereinbefore delineated characteristics of the starting materials and the application procedure be followed in order that wetting of the surfaces to be joined is achieved and that the resin fills the space between the adjacent surfaces and cures with sufficient adhesion and flexibility so that delamination does not occur on temperature cycling. For those laminated glass surfaces which are to be subjected to extreme or severe temperature cycling, as is encountered in implosion caps for cathode ray tubes, it is necessary that the cured laminating composition at from 25 to 75 degrees C. have a tensile strength between 5 and 35 p.s.i. and a >240% elongation at 25 degrees C. It has been found additionally advantageous in instances where extreme temperature is to be encountered to employ a laminating composition having a ratio of OH to epoxide of between 1 and 1.6.

A wide variety of glass surfaces may be laminated utilizing compositions in accordance with the invention. Such glass surfaces may be flat or curved but should generally conform to each other in the regions to be joined. Generally, the glass objects with which the compositions of the present invention are most beneficially employed are cathode ray tubes and safety caps therefor. Beneficially, such caps and tubes should fit as closely as possible, but commercially available glass tubes and caps are found in many instances to provide a clearance of from about 30 to about 100 mils.

The following examples illustrate ways in which the principles of the invention has been applied but are not to be construed as limiting its scope.

EXAMPLE 1

A laminating resin was prepared by mixing together and flashing at 100 degrees C. and at an absolute pressure of about 5 mm. Hg, 27% by weight of an epoxy resin (commercially available under the designation DER 331) of the aforementioned formula wherein $w$ has a value of 0.15, 44% by weight of a glycerine-propylene oxide ether of the aforementioned formula wherein R is

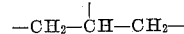

having an average molecular weight of 300 and terminated with about 10 mole percent of oxyethylene units, and 29% by weight of a glycerine-propylene oxide ether of the aforementioned formula wherein R is

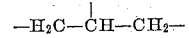

having an average molecular weight of 700 and therefore producing an average molecular weight of the total polypropylene oxide-glycerine ether of about 1300. This mixture was designated mixture A. A second mixture was prepared consisting of 49.4% by weight of a polypropylene glycol having an average molecular weight of 400, 49.4% by weight of a polypropylene glycol having an average molecular weight of 750, providing a 98.8% polypropylene glycol having an average molecular weight of 522 and 1.2% $BF_3$ as a 48% complex in diethyl ether. This mixture was heated at a temperature of about 38 to 40 degrees C. under an absolute pressure of about 2 mm. Hg, to distill and remove the diethyl ether. The resulting mixture was designated mixture B.

A 21 inch cathode ray tube envelope was positioned adjacent to a glass safety cap which generally conformed to the viewing surface and extended upwardly toward the face portion of the envelope. The envelope and the shield were maintained at a spacing of approximately 40 mils while heated to a temperature of from about 60 to about 80 degrees C. Mixture A was heated to a temperature of about 50 to about 70 degrees C. and 100 parts of mixture A was added and thoroughly mixed with 9 parts of mixture B which were at room temperature. The laminating resin composition resulting from admixture of mixtures A and B was poured between the envelope and the protective safety cap to completely fill the space therebetween. After a period of about 15 minutes the resin cured and the assembly was permitted to cool to room temperature. The resultant laminate was clear and showed no indication of bubbles, cracks, or delamination.

The above procedure was repeated until a total of 91 envelopes were laminated to safety caps. The laminated tubes were cooled to −40 degrees F. over a period of about 5 hours and were maintained at that temperature for a period of 4 hours. At the end of 4 hours they were warmed to room temperature over a period of about 2 hours and inspected for cracks and delamination. The laminated envelopes were heated to a temperature of 167 degrees F. over a period of 2 hours and maintained at this temperature. At the end of an 8-hour period they were cooled again to room temperature. This temperature cycling was repeated until a total of 5 complete cycles was made. Of the 91 tubes so evaluated, 77 were found to be entirely satisfactory and no sign of delamination, cracks, or other disfigurements was observed. The other 14 tubes were found unfit and inspection indicated that the dimensional tolerances of spacing between the tube envelope and the safety shield was about one-third (⅓) the specified spacing, i.e., about 15 mils.

EXAMPLE 2

The procedure of Example 1 was followed in the following experiments with the composition of the laminating resin as shown therein.

*Mixture A*

26.2% by weight epoxy resin of Example 1;
70.8% by weight polypropylene glycol ether of glycerine of Example 1;
3% by weight triphenyl phosphite.

*Mixture B*

98.8% by weight polypropylene glycol having an average molecular weight of 400;
1.2% by weight $BF_3$.

Mixture A was heated to a temperature of about 50 to 70 degrees C. and 100 parts thereof were thoroughly mixed with 9 parts of mixture B at room temperature. A total of 34 safety caps were laminated to cathode ray tubes and tested by temperature cycling as in Example 1. Only two tubes failed to pass the test.

In a like manner 5 additional tubes were laminated employing the above composition except that 100 parts of mixture A was mixed with 10 parts of mixture B. None of the 10 tubes failed to pass the test.

In a like manner 2 additional tubes were laminated employing the above composition except that 100 parts of mixture A was mixed with 11 parts of mixture B. None of the two tubes failed the test.

EXAMPLE 3

In a like manner to Example 1, the following laminating composition was prepared and tested:

*Mixture A*

27.0% by weight epoxy resin of Example 1;
73.0% by weight poly-1,2-propylene glycol ether of glycerine having an average molecular weight of 1300 and containing about 6% oxyethylene capping.

*Mixture B*

98.8% by weight polyethylene glycol having an average molecular weight of 600;
1.2% by weight $BF_3$.

In the manner of Example 1, 54 safety caps were laminated to cathode ray tubes and of this number 9 failed the temperature cycling test.

EXAMPLE 4

In a like manner to Example 1, the following laminating composition was prepared and tested:

*Mixture A*

45% by weight epoxy resin of the aforementioned formula wherein $w$ has a value of 0.56;
31% by weight of a poly-1,2-propylene glycol ether of glycerine having an average molecular weight of 700, and
24% by weight of a poly-1,2-propylene glycol having an average molecular weight of 750.

*Mixture B*

75% by weight of a polypropylene glycol having an average molecular weight of 750;
23.85% by weight of dipropylene glycol;
1.15% by weight of $BF_3$.

A total of 5 cathode ray tubes were laminated with a resin prepared from 100 parts of mixture A and 8.7 parts of mixture B and tested in accordance with Example 1 and one failed the test.

EXAMPLE 5

The procedure of Example 1 was followed in this experiment except where otherwise noted. As no glycol was employed in this composition, the $BF_3$ and the triphenyl phosphite were mixed with a portion of the polyoxyalkylene glycol ether and the diethyl ether removed therefrom before mixing with the remainder of the composition. The final composition was as follows:

23 parts by weight epoxy resin of Example 1;
27 parts by weight poly-1,2-propylene glycol ether having an average molecular weight of 700, and
50 parts by weight of a polypropylene glycol of an average molecular weight of 3000;
3 parts by weight triphenylphosphite;
0.11 parts by weight $BF_3$.

The composition before curing had a viscosity of <200 cps. at pour temperature (60 degrees C.) and the cured composition had a tensile strength of 22 p.s.i. at 25 degrees C., >5 p.s.i. at 75 degrees C. and an elongation of 247% at 25 degrees C. The lamination of safety caps to cathode ray tubes with this material is successful and withstands the temperature cycling test.

EXAMPLE 6

In accordance with Example 5, the following composition was prepared and tested:

23 parts by weight epoxy resin of Example 1;
77 parts by weight poly-1,2-propylene glycol ether of glycerine having an average molecular weight of 1030 and having no oxyethylene capping;
3 parts by weight of triphenylphosphite;
0.11 part by weight $BF_3$.

The composition before curing had a viscosity of <200 cps. at pour temperature (60 degrees C.) and the cured composition had a tensile strength of 24 p.s.i. at 25 degrees C., >5 p.s.i. at 75 degrees C. and an elongation of 367% at 25 degrees C. The lamination of safety caps to cathode ray tubes with this material is successful and withstands the temperature cycling test.

EXAMPLE 7

In accordance with Example 5, the following composition was prepared and tested:

15 parts by weight epoxy resin of Example 1;
85 parts by weight poly-1,2-propylene glycol ether of glycerine having an average molecular weight of 2700 and having no oxyethylene capping;
3 parts by weight of triphenylphosphite;
0.11 part by weight of BF$_3$.

The composition before curing had a viscosity of <200 cps. at pour temperature (60 degrees C.) and the cured composition had a tensile strength of 26 p.s.i. at 25 degrees C., >5 p.s.i. at 75 degrees C. and an elongation of 286% at 25 degrees C. The lamination of safety caps to cathode ray tubes with this material is successful and withstands the temperature cycling test.

In each of the compositions shown in the examples, polyglycol ethers of sucrose may be employed in place of the polyglycol ethers of glycerine and a laminating resin suitable for lamination of safety caps to cathode ray tubes will be produced.

We claim:

1. A composition comprising (a) from 15 to 45% by weight of an epoxy resin having an average molecular weight between 344 and 500 which resin is a bisphenol-A-epichlorohydrin reaction product having the general formula:

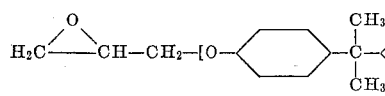

wherein $w$ is an average value between .014 and 0.56 and said epoxy resin has an average epoxide equivalent weight of from 172 to 250, (b) from 20 to 85% by weight of a polyglycol either of from 700 to 3300 average molecular weight and having the general formula:

$$([(OC_nH_{2n})_x(OC_2H_4)_y—OH]_m$$

wherein R is a polyvalent aliphatic hydrocarbon radical containing from 3 to 12 carbon atoms, $x$ is a whole number from 1 to 19, $y$ is an integer from 0 to 4, $n$ is an integer from 3 to 4 and $m$ is an integer from 3 to 8, and (c) from 0 to about 50% by weight of a glycol having an average molecular weight of from 62 to 3000 and having the formula:

$$H(OC_mH_{2n})_x(OC_2H_4)_y—OH$$

wherein $x$ is an integer from 1 to 52, $y$ is an integer from 0 to 13 and $n$ is an integer from 2 to 4 and containing in intimate admixture therewith from 0.05 to 0.15 part by weight of a boron trihalide hardening catalyst.

2. A composition comprising (a) from 15 to 45% by weight of an epoxy resin having an average molecular weight between 350 and 440 which resin is a bisphenol-A-epichlorogydrin reaction product having the general formula:

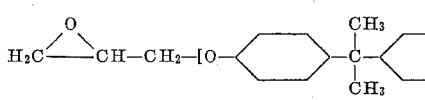

wherein $w$ is an average value between .035 and 0.35 and said epoxy resin has an average epoxy equivalent weight of from 175 to 220, (b) from 20 to 85% by weight of a polyglycol ether of from 1000 to 3000 average molecular weight and having the general formula:

$$R[(OC_nH_{2n})_x(OC_2H_4)_y—OH]_m$$

wherein R is a polyvalent aliphatic hydrocarbon radical containing from 3 to 12 carbon atoms, $x$ is a whole number from 1 to about 17, $y$ is an integer from 0 to 4, $n$ is an integer from 3 to 4 and $m$ is an integer from 3 to 8 and (c) from 5 to 15% by weight of a glycol of from about 250 to 3000 molecular weight having the formula:

$$H(OC_nH_{2n})_x(OC_2H_4)_y—OH$$

wherein $x$ is an integer from 4 to 52, $y$ is an integer from 0 to 13 and $n$ is an integer from 2 to 4, and from 0.05 to 0.15% by weight of a boron trihalide hardening catalyst.

3. A composition comprising (a) from 15 to 45% by weight of an epoxy resin having an average molecular weight between 350 and 440 which resin is a bisphenol-A-epichlorohydrin reaction product having the general formula:

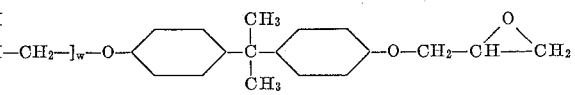

wherein $w$ is an average value between .035 and 0.35 and said epoxy resin has an average epoxy equivalent weight of from 175 to 220, (b) from 20 to 85% by weight of a polyglycol ether of from 1000 to 3000 average molecular weight and having the general formula:

$$R[(OC_nH_{2n})_x(OC_2H_4)_y—OH]_m$$

wherein R is a polyvalent aliphatic hydrocarbon radical containing from 3 to 12 carbon atoms, $x$ is a whole number from 1 to 17, $y$ is an integer from 0 to 4, $n$ is an integer from 3 to 4 and $m$ is an integer from 3 to 8 and (c) from 5 to 15% by weight of a glycol of from about 250 to 3000 molecular weight and having the formula:

$$H(OC_nH_{2n})_x(OC_2H_4)_y—OH$$

wherein $x$ is an integer from 4 to 52, $y$ is an integer from 0 to 13 and $n$ is an integer from 2 to 4, and containing from 0.05 to 0.15% by weight of a boron trifluoride hardening catalyst and from 1 to 5% by weight of an aryl phosphite stabilizer based on the total of (a), (b) and (c).

4. A composition comprising (a) from 15 to 45% by weight of an epoxy resin having an average molecular weight between 344 and 500 which resin is a bisphenol-A-epichlorohydrin reaction product having the general formula:

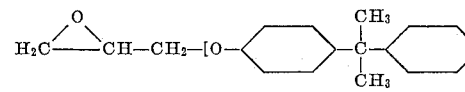

wherein $w$ is an average value between 0.014 and 0.56 and said epoxy resin has an average epoxy equivalent weight of from 172 to 250, (b) from 20 to 85% by weight polyglycol ether of from 700 to 3300 average molecular weight and having the general formula:

$$R[(OC_nH_{2n})_x(OC_2H_4)_y—OH]_m$$

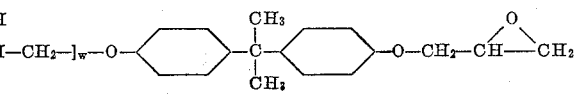

wherein R is a polyvalent aliphatic hydrocarbon radical containing from 3 to 12 carbon atoms, $x$ is a whole number from 1 to 19, $y$ is an integer from 0 to 4, $n$ is an integer from 3 to 4 and $m$ is an integer from 3 to 8, and from (c) 0 to about 50% by weight of a glycol having an average weight of from 62 to 3000 having the formula:

$$H(OC_nH_{2n})_x(OC_2H_4)_y\text{---}OH$$

wherein $x$ is an integer from 2 to 52, $y$ is an integer from 0 to 13, $n$ is an integer from 2 to 4 and containing an intimate admixture therewith of 0.05 to 0.15 part by weight of boron trifluoride hardening catalyst, and wherein said cured product has a tensile strength of 5 to 35 p.s.i. at a temperature of 25 to 75 degrees C. and elongation greater than 240% at 25 degrees C.

5. A cured laminating composition comprising (a) from 15 to 45% by weight of an epoxy resin having an average molecular weight between 340 and 440 which resin is a bisphenol-A-epichlorohydrin reaction product having a general formula:

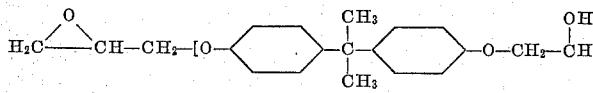

wherein $w$ is an average value between 0.035 and 0.35 and said epoxy resin has an average epoxy equivalent weight of from 175 to 220, (b) from 20 to 85% by weight of polyglycol ether of from 1000 to 3000 average molecular weight and having the general formula:

$$R[(OC_nH_{2n})_x(OC_2H_4)_y\text{---}OH]_m$$

wherein R is a polyvalent aliphatic hydrocarbon radical containing 3 to 12 carbon atoms, $x$ is a whole number from 1 to 17, $y$ is an integer from 0 to 4, $n$ is an integer from 3 to 4 and $m$ is an integer from 3 to 8, and (c) from 5 to 15% by weight of a glycol of from about 250 to 3000 molecular weight and having the formula:

$$H(OC_nH_{2n})_x(OC_2H_4)_y\text{---}OH$$

wherein $x$ is an integer from 4 to 52, $y$ is an integer from 0 to 13 and $n$ is an integer from 2 to 4 and 0.05 to 0.15% by weight of a boron trifluoride hardening catalyst, said cured composition having a tensile strength between 5 and 35 p.s.i. at from 25 to 75 degrees C. and greater than 240% elongation at 25 degrees C.

6. A cured laminating composition comprising (a) from 15 to 45% by weight of an epoxy resin having an average molecular weight between 350 and 440, which resin is a bisphenol-A-epichlorohydrin reaction product having the general formula:

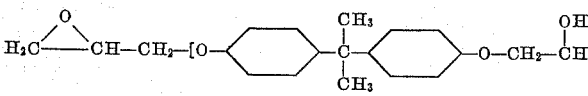

wherein $w$ is an average valve between 0.035 and 0.35 and said epoxy resin has an average epoxy equivalent weight of from 175 to 220 (b), 20 to 85% by weight of polyglycol ether of from 1000 to 3000 average molecular weight and having the general formula:

$$R[(OC_nH_{2n})_x(OC_2H_4)_y\text{---}OH]_m$$

wherein R is a polyvalent aliphatic hydrocarbon radical containing from 3 to 12 carbon atoms, $x$ is a whole number from 1 to 17, $y$ is an integer from 1 to 4, $n$ is an integer from 3 to 4, and $m$ is an integer from 3 to 8 and (c) from 5 to 15% by weight of glycol from about 250 to 3000 molecular weight and having the formula:

$$H(OC_nH_{2n})_x(OC_2H_4)_y\text{---}OH$$

wherein $x$ is an integer from 4 to 52, $y$ is an integer from 0 to 13, $n$ is an integer from 2 to 4 and containing from 0.05 to 0.15% by weight of a boron trifluoride hardening catalyst and from 1 to 5% by weight of aryl phosphite stabilizer based on total of (a), (b) and (c), said cured resin having a tensile strength between 5 and 35 p.s.i., from 25 to 75 degrees C. and greater than 240% elongation at 25 degrees C.

7. A composition as claimed in claim 1, wherein the polyglycol ethers of from 700 to 3300 average molecular weight are poly-1,2-oxypropylene ethers of glycerine.

8. A composition of claim 1, wherein the polyglycol ethers of 700 to 3300 average molecular weight are poly-oxy-1,2-propylene ethers of glycerine end capped with oxyethylene units.

9. A composition as claimed in claim 3, wherein the glycol is a polypropylene glycol.

10. A composition as claimed in claim 3, wherein the polyglycol ether of from 1000 to 3000 average molecular weight is a poly-1,2-propylene ether of glycerine.

11. A composition as claimed in claim 3, wherein the polyglycol ether of from 1000 to 3000 average molecular weight is a poly-1,2-propylene ether of glycerine end capped with oxyethylene units.

12. A composition as claimed in claim 4, wherein the polyglycol ether is a poly-1,2-propylene ether of glycerine.

13. A composition as claimed in claim 4, wherein the polyglycol ether of from 1000 to 3000 average molecular weight poly-1,2-propylene ether of glycerine end capped with oxyethylene units.

14. A composition as claimed in claim 5 wherein the polyglycol ether of from 1000 to 3000 average molecular weight is an ether of glycerine and the glycol of 250 to 3000 molecular weight is polypropylene glycol.

15. A composition as claimed in claim 5 wherein the poly glycol ether of from 1000 to 3000 molecular weight is a poly-1,2-propylene ether of glycerine end capped with oxyethylene units and the glycol of from 250 to 3000 molecular weight is polypropylene glycol.

16. A laminate structure comprising a pair of spaced apart glass surfaces adhered to opposite sides of a cured layer of at least 30 mils thick of a composition comprising (a) from 15 to 45% by weight of an epoxy resin having an average molecular weight between 344 and 500, which resin is a bisphenol-A-epichlorohydrin reaction having the general formula:

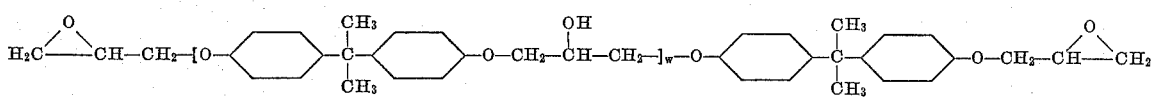

wherein $w$ is an average value between .014 and 0.56 and said epoxy resin has an average epoxide equivalent

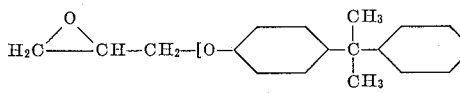

weight of from 172 to 250, (b) from 20 to 85% by weight of a polyglycol ether of from 700 to 3300 average molecular weight and having the general formula:

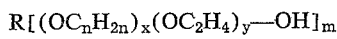

wherein R is a polyvalent aliphatic hydrocarbon radical containing from 3 to 12 carbon atoms, $x$ is a whole number from 1 to 19, $y$ is an integer from 0 to 4, $n$ is an integer from 3 to 4 and $m$ is an integer from 3 to 8, and from (c) 0 to about 50% by weight glycol having an average molecular weight of from 62 to 3000 and having the formula:

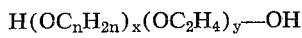

wherein $x$ is an integer from 1 to 52, $y$ is an integer from 0 to 13 and $n$ is an integer from 2 to 4 and containing in intimate admixture therewith from 0.05 to 0.15 part by weight of a boron trihalide hardening catalyst.

17. A structure according to claim 16, wherein at least one of said surfaces is a viewing surface of a cathode ray tube.

18. A structure according to claim 17, wherein the other surface is the surface of a transparent glass safety cap.

19. A laminated structure comprising the viewing surface of the cathode ray tube and a transparent glass safety cap, the cathode ray tube surface and safety cap being adhered to each other by a cured layer at least 30 mils thick of a composition comprising (a) from 15 to 45% by weight of an epoxy resin having an average molecular weight between 350 and 440 which resin is a bisphenol-A-epichlorohydrin reaction product having the general formula:

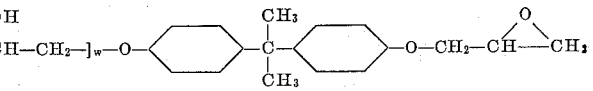

wherein $w$ is an average value between .035 and 0.35 and said epoxy resin has an average epoxy equivalent weight of from 175 to 220, (b) from 20 to 85% by weight of a polyglycol ether of from 1000 to 3000 average molecular weight and having the general formula:

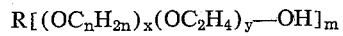

wherein R is a polyvalent aliphatic hydrocarbon radical containing from 3 to 12 carbon atoms, $x$ is a whole number from 1 to 17, $y$ is an integer from 0 to 4, $n$ is an integer from 3 to 4 and $m$ is an integer from 3 to 8 and (c) from 5 to 15% by weight of a glycol of from about 250 to 3000 molecular weight and having the formula:

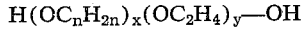

wherein $x$ is an integer from 4 to 52, $y$ is an integer from 0 to 13 and $n$ is an integer from 2 to 4, and containing from 0.05 to 0.15% by weight of a boron trifluoride hardening catalyst and from 1 to 5% by weight of an aryl phosphite stabilizer based on the total of (a), (b) and (c).

References Cited by the Examiner

UNITED STATES PATENTS

| | | | |
|---|---|---|---|
| 2,728,744 | 12/1955 | May et al. | 260—47 |
| 2,731,444 | 1/1956 | Greenlee | 260—47 |
| 2,752,269 | 6/1956 | Condo et al. | 260—47 |
| 2,872,432 | 2/1959 | Metzger | 260—47 |

FOREIGN PATENTS 880,302  10/1961  Great Britain.

ALEXANDER WYMAN, *Primary Examiner.*

G. D. MORRIS, *Assistant Examiner.*